May 26, 1942.　　　J. R. THOMAS　　　2,284,108
SPRING SEAT
Filed May 29, 1939
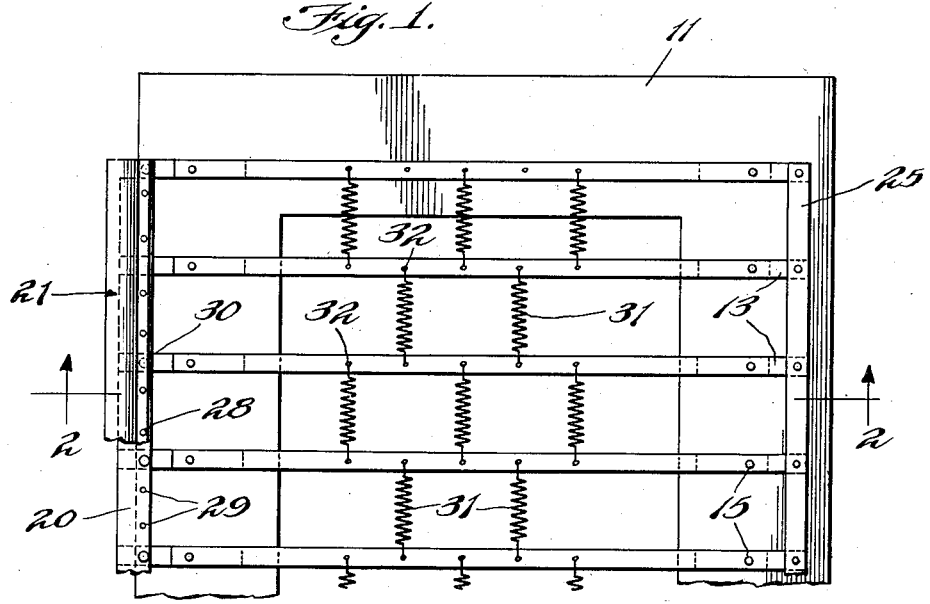
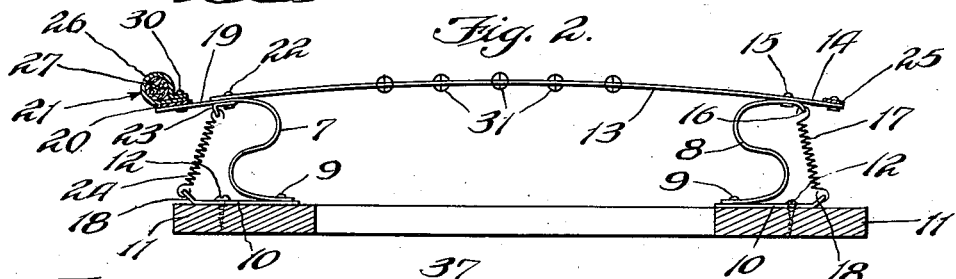
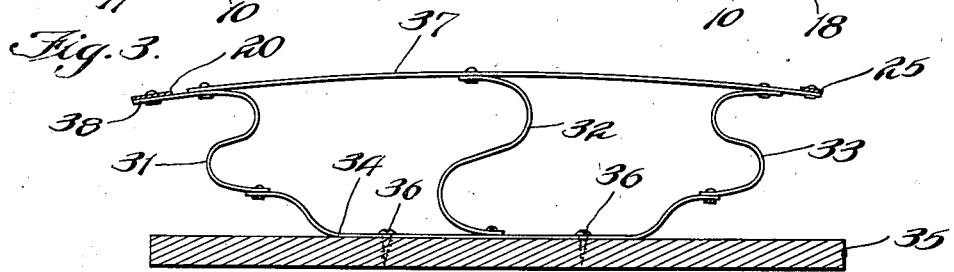
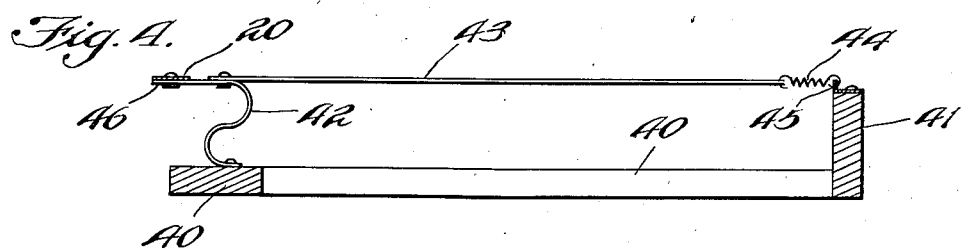
INVENTOR.
Joseph R. Thomas
BY Kent W. Wournell
ATTORNEY.

Patented May 26, 1942

2,284,108

UNITED STATES PATENT OFFICE 2,284,108

SPRING SEAT

Joseph R. Thomas, Chicago, Ill.

Application May 29, 1939, Serial No. 276,457

16 Claims. (Cl. 155—179)

This invention relates generally to spring seat structures for chairs, sofas, vehicle seats, and the like, and is more particularly described as a soft edge spring seat structure for furniture.

An important object of the invention is in the provision of a simple and efficient spring structure for producing a resilient seat and a soft edge therefor, which requires a minimum number of vertical helical springs, avoids the tying and fastening thereof, and requires much less expense and labor in upholstering and for upholsterers.

A further object of the invention is in the provision of an improved spring seat structure constructed in units which may be assembled for seats of different width and connected together for operation jointly and separately.

A still further object of the invention is in the provision of spring seat units comprising upright spring elements which provide resiliency combined with resiliently mounted connecting straps and links for confining and connecting the elements to form a seat of the desired size and resiliency.

Other and further objects of the invention will appear hereinafter, the preferred constructions and arrangements being illustrated in the accompanying drawing, in which Fig. 1 is a plan view of a portion of a seat constructed in accordance with this invention;

Fig. 2 is a section taken on the line 2—2 of Fig. 1;

Fig. 3 is a sectional view similar to Fig. 2 of a modification; and

Fig. 4 illustrates still another modification.

In all seat structures it is desirable to provide a so-called soft edge which will yield when in use so that no uncomfortable obstruction is encountered just below the knees when using the seat. If a stiff border wire is used at this point the edge is hard or unyielding and therefore uncomfortable but unless some substantial structure is employed the seat frame will be otherwise loose and objectionable. In the modern type of seat spring structures which include vertical helical springs either tied in a frame or confined in fabric pockets, a great amount of expensive work is required in fastening the springs in place and in suitably connecting them to the frame and upholstery of the seat.

The present invention is designed to overcome these difficulties by providing a resilient metal structure composed of end and intermediate springs arranged in units and suitably connected both at the ends and intermediate the ends for providing a seat structure of any desired width provided at the front with a more yielding support and with a soft edge border supported thereby which will give and yield when used as a seat but has sufficient resilience to maintain the seat in upright extended position when not engaged by a person sitting thereon.

Referring now more particularly to the drawing, one of the units of which a spring seat structure is made is shown in elevation in Fig. 2 and comprises upright springs 7 and 8 preferably of S-shaped conformation made of thin strips of clock steel or the like having great resiliency and great strength, the lower end of each spring preferably being attached by a rivet 9 or other suitable fastening means to a supporting plate 10. The plate is secured to any suitable support such as a marginal or seat frame 11 by screws 12 or other fastening means.

Extending over and connected to the upper extremities of the springs 7 and 8 is a spring metal strap 13 which has an extremity 14 at one end overlapping the upper end of the spring 8 but secured thereto by a rivet 15 and the upper extremity 16 of the spring 8 being bent to engage one end of a helical spring 17, the other end of which is engaged by an up-turned end 18 of the supporting plate 10.

At the front extremity of the spring unit an upper extremity 19 of the spring 7 is extended beyond the adjacent end of the connecting strap 13 and being of thinner and more flexible metal this projecting extremity of the spring forms a more resilient support for a connecting border strap 20 and a roll edge structure 21 secured thereto. The spring and strap at this end are joined by a fastening device 22 which also connects a fastening clip 23 at the under side thereof. One end of a helical spring 24 is connected to this clip and the other end of the spring is connected to an upturned extremity 18 of the front supporting plate 10.

In assembling a plurality of such units to form a spring seat, the units are placed side by side at spaced distances apart, the rear projecting ends 14 of the straps are joined by a connecting strip 25 and the front projecting ends 19 of the springs are joined by the connecting strip 20. In practice the roll edge consisting of a fibrous cover 26 which is looped around a longitudinally extending fibrous core 27 may be secured at intervals by fastening rivets or clips 28 to openings 29 in the flexible metal strip 20 and carried in lengths or in rolls as thus connected or joined and suitable lengths or sections being cut therefrom and attached to the spring ends 19 in any suitable lengths as desired by fastening clips, rivets or other suitable fastening means 30.

In order also to properly space and hold the seat straps together intermediate their ends, connecting flexible links 31 are positioned between adjacent straps and connected thereto at each end by riveting, clipping or by simply inserting the ends of the flexible links which may be in the form of helical springs through spaced openings 32 in the straps provided for that purpose. In this form of the invention the roll edge is supported above or in advance of the supporting frame 11, the end helical springs 17 and 24 confine and restrain the springs against upward movement and the upright springs 7 and 8 support the spring straps and with the connected helicals tend to bow the straps slightly in upward direction or if the straps are slightly curved, to maintain the curvature thereof so that an upwardly projected seat platform is provided which is adapted for use by simply placing a thin upholstered pad over the spring structure covering the roll edge and enclosing or covering the entire structure with any suitable fabric (not shown) in a well known manner.

A modified form of spring seat unit is illustrated in Fig. 3 comprising three S-springs 31, 32 and 33 connected to a metal base plate or strap 34 which in turn is attached to a frame or other support 35 by fastening means 36. The upper ends of some of these springs are attached at the ends and others are connected intermediate the ends of a spring strap 37, one extremity of which overlaps the rear spring and the front edge of which is overlapped by the projecting end 38 of the front strap. In assembling a plurality of these units, front and rear straps 20 and 25 are connected thereto as shown in Fig. 1 and intermediate connections between the straps may be provided or not as desired.

A still more simple type of spring structure is shown in Fig. 4 which may be applied to certain types of seat structures having a horizontal frame 40 with a rear upright 41. An upright S spring 42 is secured at its lower end to the front of the frame and is connected at its top to a spring metal strap 43 which is connected by a link 44 in the form of a spring helical to a fastening clip or bracket 45 at the top of the upright 41. The upper end 46 of the S spring is extended in front of the strap to provide a more flexible support for a connecting border strap 20 to which may be secured a roll edge foundation and other upholstery and roll edge structure as previously set forth.

These latter forms may likewise be secured and held in place by end helical springs, as 17 and 24, and complete seat structures are made by combining a plurality of spring units, placing them side by side in spaced apart condition and then joining them by front and rear flexible connections such as metal straps and the like.

In this type of seat structure a minimum of upholstery is required, the spring units are made in quantities and connected together, and the roll edge and end connecting structure is applied thereto in suitable lengths depending upon the length of seat desired. When assembled this spring seat structure does not collect or retain dirt or dust at the under side thereof as found in the ordinary spring tied upholstered seats or the spring-filled cushion seats and any dust or dirt that does collect can be easily blown or dislodged therefrom. In all of the forms a resilient spring seat structure with a soft and flexible roll edge is provided which may be applied to various types of seat and bed structures, for chairs, sofas, davenports, vehicle seats, and similar applications where a spring supported surface or a flexible roll edge is desirable.

I claim:

1. A seat spring structure comprising assembled units each having upright leaf springs spaced apart and secured at the bottoms, and a resilient strap connecting them at the tops, the end of one spring extending beyond the adjacent end of the connected strap providing a more resilient support and resilient tie members connected at the upper ends to the springs and secured to a supporting base at the bottoms thereof.

2. In a seat spring, a plurality of assembled units each comprising upright S-shaped leaf springs secured at their lower ends to a base support, a strap connecting the upper ends of the springs, one of said connected parts extending outwardly beyond their point of connection to provide a more resilient outer support and tie springs connected at the upper ends to the leaf springs and at the lower ends to said base support.

3. In a spring unit for seats, a supporting base, a pair of upright curved leaf springs oppositely secured to the base at spaced distances apart, a strap connecting the upper ends of the springs, the end of one spring extending beyond the adjacent end of the connected strap providing a more resilient support, and a roll edge structure connected to said extending spring end.

4. A spring seat comprising a base, upright S-shaped leaf springs disposed oppositely at the front and rear sides of the base, a strap of stiffer material connecting the upper ends of corresponding leaf springs overlapping the upper end of the rear spring and the front spring extending beyond the end of the strap, and roll edge forming means attached to the more resilient projecting ends at the front of the seat.

5. In a spring seat structure, a plurality of units each comprising opposite front and rear curved upright leaf springs, an attaching plate for the lower end of each spring, a strap connecting the upper ends of the front and rear springs, and a flexible coil spring extending from the upper end of the leaf spring at the outer side thereof and connected to the corresponding attaching plate at its lower end.

6. A spring seat structure comprising a plurality of spring units each including front and rear upright curved leaf spring members, a flat resilient strip-like member connecting the tops of said front and rear leaf spring members, one of said members being extended beyond the said connections to provide resilient extensions, flexible connecting rails at front and rear attached to the outer ends of said extensions for joining said units, spring tie means connected to the upper end of each spring member and to the seat structure below it tending to draw said member downwardly, and resilient means connecting the strips of the units intermediate their ends.

7. A spring seat structure comprising a plurality of separately formed flexible flat strip units placed side by side, each unit having upright leaf springs at each end, a strap connecting the tops of the leaf springs of each unit, each unit having a flexible extension beyond the connection of the strap and spring, resilient means connected to the upper end of each leaf spring at the outer side thereof tending to draw it downwardly, flexible connecting means attached to the flexible extensions of the strip units at their front and rear ends, and spring links connecting the straps intermediate the ends.

8. A spring metal soft edge seat structure comprising flat metal spring units having upright leaf springs at the ends, flat straps connected to the upper ends of the leaf springs at a distance from the end thereof, the ends of the leaf springs extending beyond the straps to provide a more flexible support, and a roll edge forming strip attached to the extremities of the leaf springs beyond the ends of the straps so the roll edge will flex independently of the straps to form a soft edge.

9. In a spring metal soft edge seat structure, an upright curved flat leaf spring attached at its bottom to a supporting base, a flat connecting strap attached to the upper end of the spring, the upper end of the spring continuing forwardly beyond the end of the strap to provide a more flexible support, and a flexible roll edge strip attached to the forwardly projecting upper extremity of the spring.

10. A structure according to claim 9 in which the lower end of the leaf spring is attached to a supporting plate, and a coil spring connected to the plate and to the spring at its attachment to the strap for resiliently holding the leaf spring in place.

11. A structure according to claim 9, in which the lower end of the leaf spring is attached to an outwardly projecting supporting plate having an upturned extremity, and a coil spring attached at one end to the upturned extremity of the supporting plate and at the other end to a bracket affixed at the connection of the spring and the strap.

12. A spring metal seat structure comprising a plurality of adjacent units each having an upright S-shaped leaf spring, a supporting plate attached to the lower end of the spring, a connecting strap attached to the upper end of the spring, resilient connecting means attached to the upper end of the spring and extending transversely for attachment to other springs, and a coil spring attached at one end to the upper extremity of the spring and at the lower end to the supporting plate on the outer side of said spring for resiliently holding the leaf spring in place.

13. In a spring metal seat structure, a plurality of S-shaped leaf springs, a base to which the lower ends of the springs are attached and held in an upright position, a flexible strap connected to the upper ends of the springs, one spring at each end of the strap; the upper end of a spring extending outwardly beyond its connection with the strap to provide a more resilient outer support, spring means tending to hold the leaf springs partially compressed, and means connected intermediate the ends of the strap for additionally supporting it.

14. In a spring metal seat structure, a seat unit comprising an S-shaped upright leaf spring having a supporting base to which the lower end is connected, a strap connected to the upper end of the spring with the extremity of the spring extending beyond the end of the strap, flexible means at the other end of the strap for restraining the leaf spring, and a roll edge strip attached to the spring extremity of each unit to flex thereon with respect to the spring and strap.

15. In a spring unit for seats, a supporting base, a pair of upright curved leaf springs oppositely secured to the base at spaced distances apart, a strap connecting the upper ends of the springs, the end of one spring extending beyond the adjacent end of the connected strap and providing a more resilient support than the strap.

16. A spring seat comprising a supporting base, upright leaf springs disposed oppositely at the front and rear of the base, straps of stiffer material connecting the upper ends of corresponding leaf springs, the upper ends of some of the leaf springs overlapping and extending beyond the point of connection with the straps and the ends of the straps not so overlapped by the springs extending beyond their points of connection with the springs to provide more resilient seat supports beyond the said points of connection than at the juncture thereof.

JOSEPH R. THOMAS.